US008923992B2

(12) United States Patent
Baek

(10) Patent No.: US 8,923,992 B2
(45) Date of Patent: Dec. 30, 2014

(54) SAFETY EXTENSION BASE AND CONTROL METHOD THEREOF

(75) Inventor: Seung jae Baek, Gunpo-si (KR)

(73) Assignee: LS Industrial Systems Co., Ltd., Anyang-Si, Gyeonggi-Do (KR)

(*) Notice: Subject to any disclaimer, the term of this patent is extended or adjusted under 35 U.S.C. 154(b) by 365 days.

(21) Appl. No.: 13/522,949

(22) PCT Filed: Jan. 19, 2011

(86) PCT No.: PCT/KR2011/000389
§ 371 (c)(1),
(2), (4) Date: Jul. 18, 2012

(87) PCT Pub. No.: WO2011/090315
PCT Pub. Date: Jul. 28, 2011

(65) Prior Publication Data
US 2012/0303143 A1 Nov. 29, 2012

(30) Foreign Application Priority Data
Jan. 20, 2010 (KR) ........................ 10-2010-0005209

(51) Int. Cl.
G05B 9/02 (2006.01)
G05B 11/01 (2006.01)
G05B 19/18 (2006.01)
G05B 19/05 (2006.01)
G06F 11/07 (2006.01)

(52) U.S. Cl.
CPC .......... *G05B 19/058* (2013.01); *G06F 11/0796* (2013.01)
USPC ...................... 700/82; 700/3; 700/21; 700/79

(58) Field of Classification Search
USPC ........................................... 700/3, 21, 79, 82
See application file for complete search history.

(56) References Cited

U.S. PATENT DOCUMENTS

| | | | | | |
|---|---|---|---|---|---|
| 4,521,871 | A | * | 6/1985 | Galdun et al. | 714/11 |
| 4,797,884 | A | * | 1/1989 | Yalowitz et al. | 714/13 |
| 5,313,386 | A | * | 5/1994 | Cook et al. | 700/82 |
| 5,966,304 | A | * | 10/1999 | Cook et al. | 700/82 |

FOREIGN PATENT DOCUMENTS

| | | |
|---|---|---|
| CN | 1189641 | 8/1998 |
| CN | 201233527 | 5/2009 |
| CN | 201352398 | 11/2009 |
| EP | 1748336 | 1/2009 |
| JP | 2008310534 | 12/2008 |
| KR | 10-0790747 | 1/2008 |
| KR | 10-2008-0071851 | 8/2008 |
| KR | 1020090071891 | 7/2009 |

* cited by examiner

*Primary Examiner* — Mohammad Ali
*Assistant Examiner* — Jennifer L Norton
(74) *Attorney, Agent, or Firm* — Lee, Hong, Degerman, Kang & Waimey

(57) ABSTRACT

A safety-extension base connected to a main base and a control method thereof are disclosed, the base includes a communication unit, a system state monitoring unit, a module control unit, a memory unit, a state conversion unit and a safety-processing unit. The communication unit performs data communication with the main base. The system state monitoring unit monitors a state of the PLC system. The module control unit controls a general operation of the safety-extension base and outputs different cases of control signals. The memory unit stores the data transmitted from the main base and a program and information. The state conversion unit converts the state of the safety-extension base into the normal state or safety state. The safety-processing unit performs a control of the safety-extension base.

3 Claims, 8 Drawing Sheets

SAFETY EXTENSION BASE AND CONTROL METHOD THEREOF

CROSS-REFERENCE TO RELATED APPLICATIONS

This application is the National Stage filing under 35 U.S.C. 371 of International Application No. PCT/KR2011/000389, filed on Jan. 19, 2011, which claims the benefit of earlier filing date and right of priority to Korean Application No. 10-2010-0005209, filed on Jan. 20, 2010, the contents of which are all hereby incorporated by reference herein in their entirety.

TECHNICAL FIELD

The present invention relates to control of a safety-extension base, and more particularly, to a safety-extension base and a control method thereof, in which the safety-extension base is independently maintained and controlled in a safety state, separately from control of a main base, in a programmable logic controller (PLC) system.

BACKGROUND ART

A programmable logic controller (PLC) is an electronic device connected to various devices so as to systematically control these devices. A PLC system uses a programmable memory to perform a special function such as logic, sequencing, timing, counting or computation through a digital or analog input/output module, and controls various types of machines or processors.

Generally, the PLC system is one of the most basic and important control systems together with industrial automation, and is frequently used in facility automation of factories, buildings, etc. The PLC system currently satisfies various spot requirements, not only by performing complicated application computation from initial basic computation, but also by forming industrial networks. As new up-to-data devices are introduced to the PLC, an extension PLC system has been recently introduced, in which a plurality of extension bases is connected in addition to a main base to control a more complicated network.

While productivity increase has become an importance factor on industrial spots, interest in safety for reducing human and material damage in the operation of the complicated PLC system has recently increased. Particularly, trends are regulations and requirements for safety are further deepened. According to such requirements, it is important, more than anything else, to reduce material damage caused by malfunction and human damage according to the material damage by controlling the PLC system to operate each of the plurality of extension bases connected to the main base.

FIG. 1 is a configuration diagram of a conventional single PLC system.

Referring to FIG. 1, in the conventional single PLC system, a plurality of extension bases 11 is connected to a main base 10 through communication cables 12. Each extension base 11 is controlled by the main base 10 and operates depending on the state of the main base 10. Thus, the extension base 11 has a structure in which the extension base 11 is passively operated by the main base 10.

FIG. 2 is a configuration diagram of a conventional redundant PLC system.

Referring to FIG. 2, the conventional redundant PLC system has a structure in which a main base 20 is divided into a master main base 21 and a standby main base 22. Each extension base 23 is connected to any one of the master main base 21 and the standby main base 22 through a communication cable 24. Similarly to FIG. 1, each extension base 23 is controlled by the main base 20, and is passively operated by the main base 20. In a case an error occurs in the master main base 21, the standby main base 22 takes over control authority from the main base 21 so as to control each extension base 23.

However, in a case a defect occurs in the conventional PLC system, the main base recognizes the occurrence of the defect and provides the state of the system to the extension bases. This is because the system has a dependent structure in which the extension bases are controlled according to the presence of recognition of the main base with respect to the defect and the recognizable performance of the main base. Therefore, in a case a defect occurs in the conventional PLC system, the main base does not recognize or slowly recognizes the occurrence of the defect, and hence the state of the system is not properly provided to the extension bases. Accordingly, malfunction may occur in devices mounted to the extension bases, and human and material damage according to the malfunction may be caused. Since a control module of the extension base has a dependent structure of the main base, the control module of the extension base does not recognize the state of the system for itself. Therefore, the extension base does not independently operate, and accordingly, the system is exposed to risk cause by the malfunction.

DISCLOSURE

Technical Problem

The present invention is conceived to solve the aforementioned problems. Accordingly, an object of the present invention is to provide a safety-extension base and a control method thereof, which can maintain and control a safety-extension base connected to a main base so that the state of the safety-extension base is independently converted into a predetermined safety state, separately from the main base, thereby protecting a programmable logic controller (PLC) system.

Technical Solution

According to an aspect of the present invention, there is provided a safety-extension base connected to a main base in a programmable logic controller (PLC) system, including: a communication unit configured to perform data communication with the main base; a system state monitoring unit configured to monitor a state of the PLC system using data communicated between the communication unit and the main base; a module control unit configured to control a general operation of the safety-extension base and output a different case of control signals according to whether the state of the PLC system is a normal state; a memory unit configured to store the data transmitted from the main base and a program and information, necessary for controlling the safety state of the safety-extension base; a state conversion unit configured to convert the state of the safety-extension base into the normal state or safety state according to the control signal output from the module control unit; and a safety-processing unit configured to perform a control of the safety-extension base using the information transmitted from the main base in a case the state of the safety-extension base is converted into the normal state by the state conversion unit, and perform a control of the safety-extension base according to a user-defined program previously stored in the memory unit in a case the state of the safety-extension base is converted into the safety state by the state conversion unit.

The communication unit may receive, from the main base, initial operation information including initial parameters and setup information and operation information including parameters and a program, previously defined by a user so that a safety-state control is performed by converting the state of the safety-extension base into the safety state in a case a defect occurs in the PLC system.

The system state monitoring unit may decide whether or not the safety-extension base is to perform a normal-state control by checking whether or not the initial operation information is normal.

In a case the state of the safety-extension base is converted into the safety state, the safety-processing unit may independently perform the control of the safety-extension base, separately from the data transmitted from the main base.

According to another aspect of the present invention, there is provided a control method of a safety-extension base connected to a main base in a PLC system, the method including: receiving data transmitted from the main base; monitoring a state of the PLC system using the transmitted data; performing a normal-state control of the safety-extension base using the data transmitted from the main base in a case the PLC system is normal as the monitored result, and converting the state of the safe-extension base into a safety state in a case the PLC system is not normal; and independently performing a safety-state control using a predetermined user-defined program, separately from the main base, in a case the state of the safety-extension base is converted into the safety state.

The receiving of the data transmitted from the main base may include receiving the predetermined user-defined program from the main base.

Advantageous Effects

According to the present invention, in a PLC (programmable logic controller) system, an extension base connected to a main base can maintain and control the system to be in a safety state, independently from the main base.

Further, it is possible to protect devices mounted to the extension base and to prevent human and material damage caused by malfunction of the devices in a case the system is in an error state due to a fault or defect of the main base.

MODE FOR CARRYING OUT THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
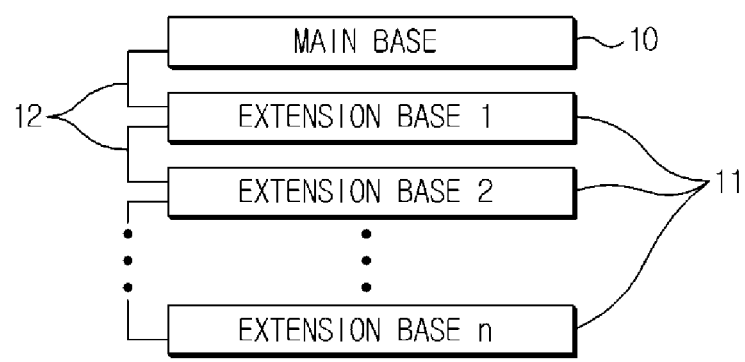
FIG. 1 is a configuration diagram of a conventional single programmable logic controller (PLC) system.
Figure 2:
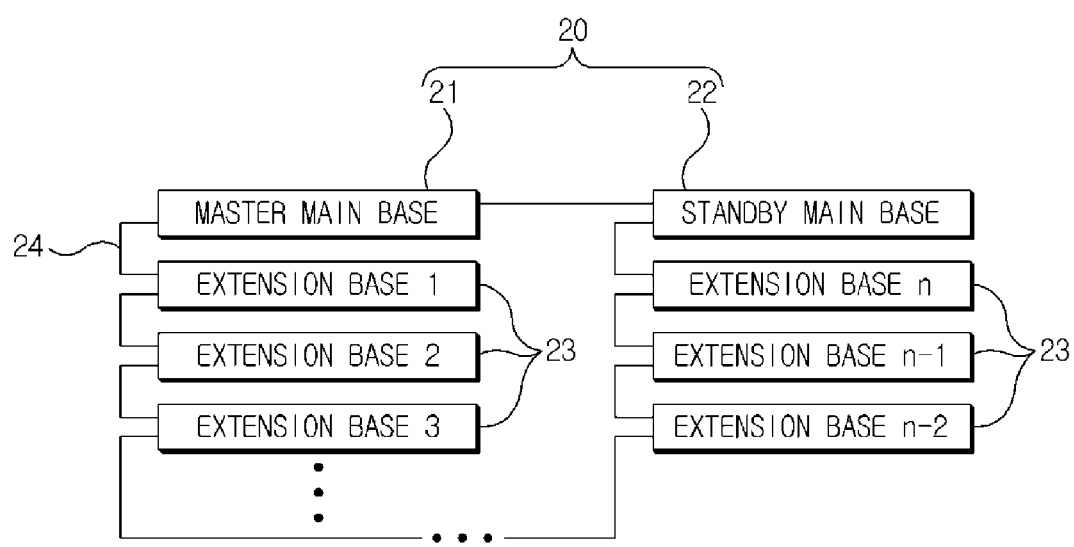
FIG. 2 is a configuration diagram of a conventional redundant PLC system.
Figure 3:
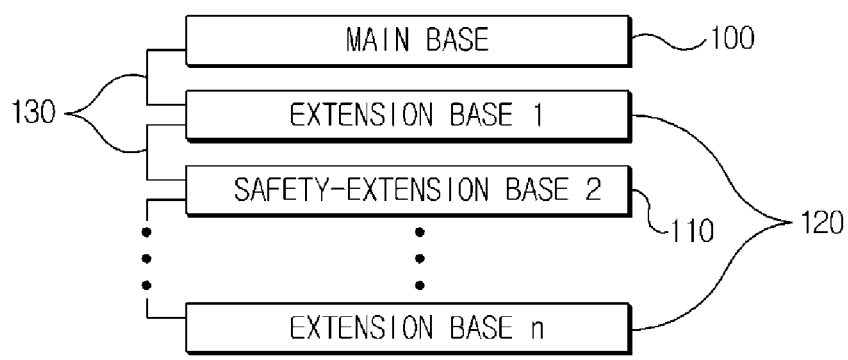
FIG. 3 is a diagram illustrating a configuration in which a safety-extension base is connected in a single PLC system according to an embodiment of the present invention.

FIG. 3 is a diagram illustrating a configuration in which a safety-extension base is connected in a single PLC (Programmable logic controller) system according to an embodiment of the present invention.

Referring to FIG. 3, the safety-extension base 110 according to this embodiment is connected together with a plurality of general extension bases 120 to a main base 100. The safety-extension base 110 and the plurality of general extension bases 120 communicate data with the main base 100 through a series of communication cables 130. The data may become input/output values of each of the extension bases 110 and 120. The data may also become state values or parameter values of modules mounted to each of the extension bases 110 and 120. Here, each general extension base 120 receives initial parameters and related setup information provided from the main base 100, and the operation of each general extension base 120 is continuously controlled by the main base 100. On the other hand, the safety-extension base 110 according to this embodiment receives not only initial parameters and related setup information provided from the main base 100 but also parameters, programs, etc., which are defined by a user, so that the state of the safety-extension base 110 is converted into a safety state in a case a fault, error, defect, etc. occurs in the main base 100. Thus, the safety-extension base 110 decides whether or not the state of the safety-extension base 100 must be converted into the safety state by subsequently monitoring the PLC system. In a case the state of the safety-extension base 110 is converted into the safety state, the safety-extension base 110 controls the general extension bases 120 by independently driving a safety program defined by the user, separately from the main base 100.

Figure 4:
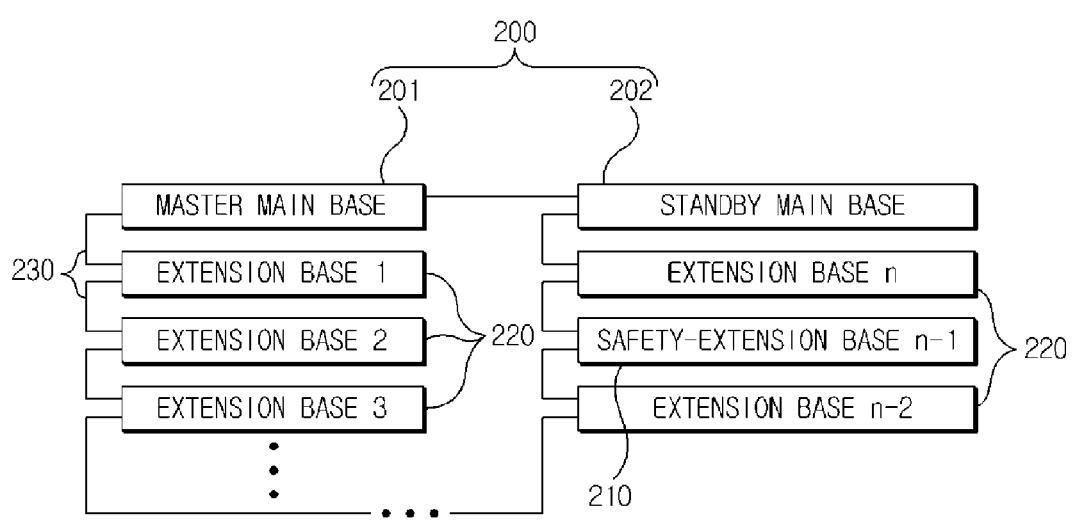
FIG. 4 is a diagram illustrating a configuration in which a safety-extension base is connected in a redundant PLC system according to another embodiment of the present invention.

FIG. 4 is a diagram illustrating a configuration in which a safety-extension base is connected in a redundant PLC system according to another embodiment of the present invention.

Referring to FIG. 4, the redundant PLC system according to this embodiment has a structure in which a main base 200 is divided into a master main base 201 and a standby main base 202. A safety-extension base 210 is connected together with a plurality of general extension bases 220 to the main base 200. Each of the safety-extension base 210 and the general extension bases 220 is connected to at least one of the master main base 201 and the standby main base 202. The safety-extension base 210 and the general extension bases 220 communicate data with the at least one of the master main base 201 and the standby main base 202 through a series of communication cables 230. The data may become input/output values of each of the safety-extension bases 210 and the general extension bases 120. The data may also become state values or parameter values of modules mounted to each of the extension bases 210 and 220. Here, similarly to FIG. 3, each general extension base 220 receives initial parameters and related setup information provided from the main base 200, and the operation of each general extension base 220 is continuously controlled by the main base 200. On the other hand, the safety-extension base 210 receives not only initial parameters and related setup information provided from the main base 200 but also parameters, programs, etc., which are defined by a user, so that the state of the safety-extension base 210 is converted into a safety state in a case a fault, error, defect, etc. occurs in the main base 200. Thus, the safety-extension base 210 decides whether or not the state of the safety-extension base 200 must be converted into the safety state by subsequently monitoring the PLC system. In a case the state of the safety-extension base 210 is converted into the safety state, the safety-extension base 210 controls the general extension bases 220 by independently driving a safety program defined by the user, separately from the main base 200.

Figure 5:
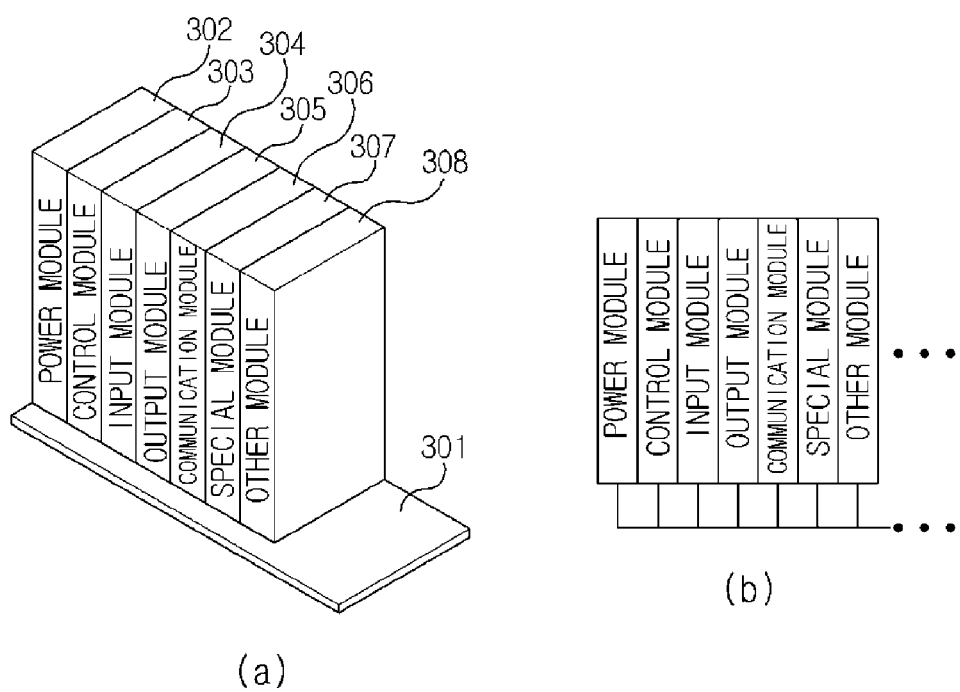
FIG. 5 is a schematic configuration diagram of a safety-extension base according to an embodiment of the present invention.

FIG. 5 is a schematic configuration diagram of a safety-extension base according to an embodiment of the present invention.

FIG. 5(a) illustrates a configuration of the safety-extension base according to the embodiment of the present invention, and FIG. 5(b) is a block diagram schematically illustrating the configuration of the safety-extension base.

Referring to FIGS. 5(a) and 5(b), the safety-extension base 300 according to this embodiment is configured to include a power module 302 that supplies power to each module mounted on a base 301, a control module 303 that controls a general operation of the safety-extension base 300, an input module 304 that takes charge of inputs, an output module 305 that takes charge of outputs, a communication module 306 that takes charge of communication, a special module 307 that performs a special function, and another module 308 that performs a predetermined object. Here, the modules are mounted on a base 301. Another predetermined module may be additionally mounted on the base 301. Each of the modules 302 and 304 to 308 is controlled by the control module 303, and the control module 303 is controlled by a main base as described above. That is, the main base provides, to the control module 303 of the safety-extension base 300, information on parameters, its own state, output values, etc. of each of the modules 302 and 304 to 308 mounted in the safety-extension base 300, and the control module 303 receives and processes the information. In a case a defect of the main base occurs, the control module 303 of the safety-extension base 300 converts the state of the safety-extension base 300 into a safety state so as to independently maintain and control general extension bases to be in the safety state, separately from the main base.

Figure 6:
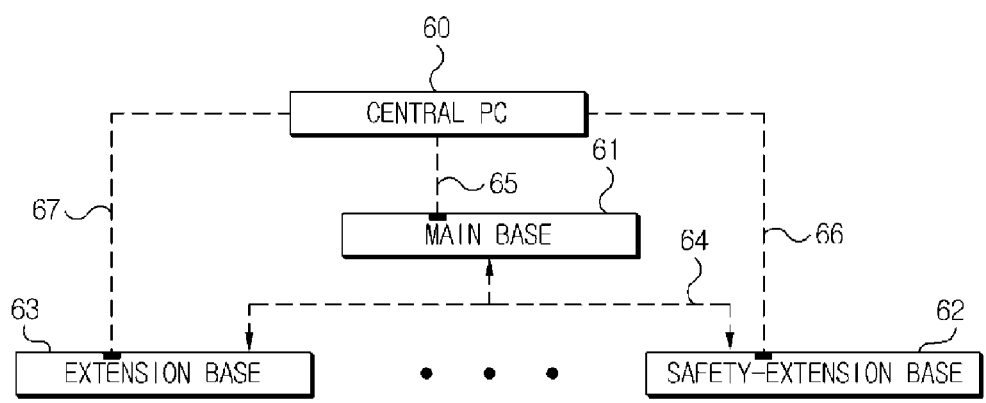
FIG. 6 is a configuration diagram of a safety-extension base to access a PLC control program tool according to an embodiment of the present invention.

FIG. 6 is a configuration diagram of a safety-extension base to access a PLC control program tool according to an embodiment of the present invention.

Referring to FIG. 6, the safety-extension base 62 according to this embodiment, as described above, is connected together with a general extension base 63 to a main base 61 through a communication cable 64, thereby building up a PLC system. In the PLC system, a PLC operation is set using a PLC control program tool in a central PC 60. The central PC may be connected to all the main base 61, the safety-extension base 62 and the general extension base 63, and a medium for each connection may be implemented using universal serial bus (USB), serial bus, Ethernet, etc. The main base 61 receives a PLC control program provided by the PLC control program tool through a corresponding PC connection among the connection 65 of the main base 61 to the central PC 60, the connection 66 of the safety-extension base 62 to the central PC 60, and the connection 67 of the general extension base 63 to the central PC 60. The main base 61 provides parameters, etc. to the safety-extension base 62 and the general extension base 63 through the communicating cable 64. The safety-extension base 62 additionally receives a setup program for the safety state, parameters, etc., which are set by a user, separately from the general extension base 63. Thus, in a case a defect of the main base 61 occurs, the state of the safety-extension base 62 is converted into the safety state according to the setup program so that the PLC system can be safely maintained and controlled.

Figure 7:
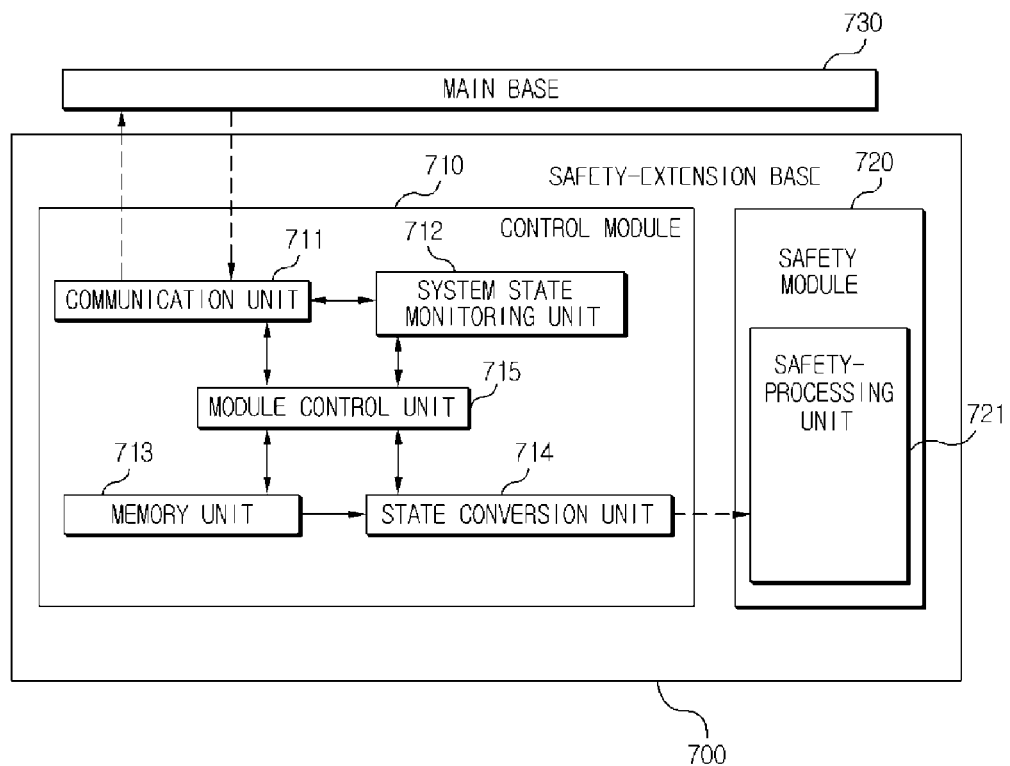
FIG. 7 is a block diagram schematically illustrating the configuration of a safety-extension base according to an embodiment of the present invention.

FIG. 7 is a block diagram schematically illustrating the configuration of a safety-extension base according to an embodiment of the present invention.

As shown in FIG. 7, the safety-extension base 700 according to this embodiment generally includes a control module 710 and a safety module 720. The control module 710 monitors the state of a PLC system through its communication with a main base 730, and allows the PLC system to perform a control in a safety state according to the safety program set by a user by converting the state of the safety-extension base 700 into the safety state in a case a defect of the PLC system occurs. The safety module 720 allows the PLC system to be maintained and managed in the safety state under the control of the control module 710. The control module 710 is configured to include a communication unit 711, a system state monitoring unit 712, a memory unit 713, a state conversion unit 714 and a module control unit 715, and the safety module 720 is configured to include a safety-processing unit 721.

The communication unit 711 performs data communication with the main base 730 and other extension bases (not shown) through predetermined cables. Particularly, the communication unit 711 receives, from the main base 730, initial operation information including initial parameters and setup information. Further, the communication unit 711 may receive operation information including parameters defined by the user and a predetermined program so that in a case a fault of the main base 730 occurs, the state of the safety-extension base 700 can be converted into the safety state. The various types of information received as described above are stored in the memory unit 713, which will be described later, in a case necessary.

The system state monitoring unit 712 checks the state of the PLC system using the initial operation information and operation information received from the communication unit 711. That is, the system state monitoring unit 712 checks whether or not the initial operation information is abnormal, and checks the state of the PLC system so as to decide whether or not the safety-extension base 700 can be operated in a normal state. The result obtained by checking the state of the PLC system is transmitted to the module control unit 715.

The module control unit 715 controls a general operation of the safety-extension base 700. Particularly, the module control unit 715 receives the result obtained by checking the state of the PLC system from the system state monitoring unit 712, and outputs a different case of control signals according to whether or not the state of the PLC system is in the normal state. That is, the module control unit 715 outputs a normal-state control signal in a case the PLC system is in the normal state, and outputs a safety-state control signal in a case the PLC system is not in the normal state.

The state conversion unit 714 converts the state of the PLC system into a normal state or safety state according to the control signal outputted from the module control unit 715. In a case the state of the PLC system is in the normal state, the state conversion unit 714 converts the state of the PLC system into the normal state. In a case the state of the PLC system is not in the normal state, the state conversion unit 714 converts the state of the PLC system into the safety state.

The memory unit 713 stores various types of information transmitted from the main base 730, and simultaneously stores various types of programs for controlling the safety-extension base 700 in the module control unit 715. Particularly, the memory unit 713 stores the initial operation information including the initial parameters and setup information of the safety-extension base 70 and the parameters and programs previously set by the user for the purpose of the safety-state control. The information stored in the memory unit 713 is not limited thereto, and it will be apparent that various types of information for implementing the PLC system may be additionally stored in a case necessary.

The safety-processing unit 721 receives a normal-state control signal or safety-state control signal from the state conversion unit 714. In a case receiving the normal-state control signal, the safety-processing unit 721 performs a normal-state control using the information transmitted from the main base 730. In a case receiving the safety-state control signal, the safety-processing unit 721 performs a safety-state control using the user-defined program stored in the memory unit 713.

Figure 8:
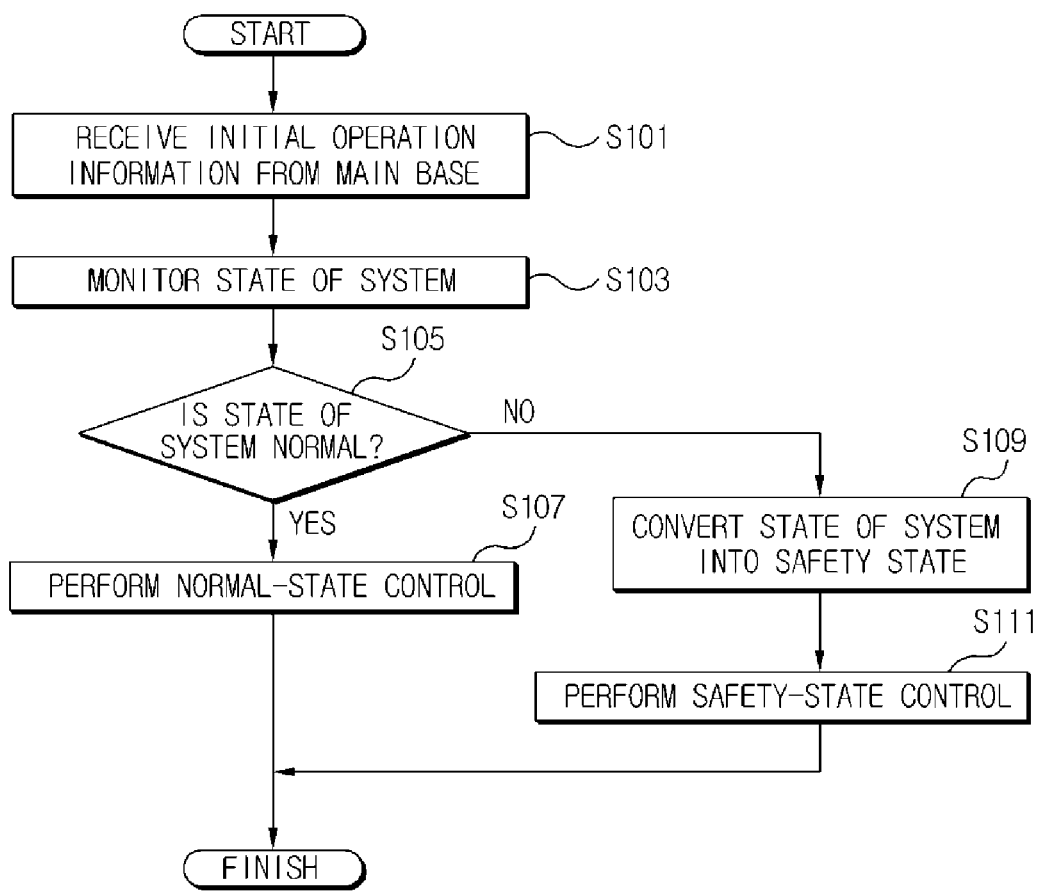
FIG. 8 is a flowchart illustrating a control method of a safety-extension base according to an embodiment of the present invention.

FIG. 8 is a flowchart illustrating a control method of a safety-extension base according to an embodiment of the present invention.

Referring to FIG. 8, in the control method of the safety-extension base according to this embodiment, the safety-extension base 700 receives initial operation information including necessary initial parameters and various types of setup information from the main base 730 through a communication cable (S101). In a case the state of the safety-extension base 700 is converted into a safety state from the main base 730 at step S101, the safety-extension base may receive the initial operation information including a program previously defined by a user. This is merely an embodiment of the present invention. In another embodiment, the user may previously store the corresponding program in the memory unit 713 of the safety-extension base 700. Subsequently, the safety-extension base 700 monitors the state of the PLC system using the initial operation information received from the main base 730 (S103). Here, the monitoring of the state of the PLC system may be performed using the initial operation information described above or using data transmitted/received through the communication between the safety-extension base 700 and the main base 730. The safety-extension base 700 decides whether or not the PLC system is in a normal state according to the result obtained by monitoring the state of the PLC system (S105). In a case the PLC system is in the normal state, the safety-extension base 700 performs a normal-state control (S107). The performing of the normal-state control maintains and controls the PLC system using input and output values provided from the main base 730, state values and parameter values of various modules mounted in the safety-extension base 700.

In a case the PLC system is not in the normal state at step S105, i.e., in a case a fault or defect occurs in the PLC system, the state of the safety-extension base 700 is converted into the safety state (S109). Then, separately from the main base 730, the safety-extension base 700 independently performs the safety-state control according to the user-defined program previously stored in the memory unit 713 (S111).

As described above, the present invention provides an extension base control module that independently maintains and controls a system to be in a safety state, separately from a main base, in a case necessary for an extension base connected to the main base. To this end, a safety-extension base is connected to the main base through a predetermined communication cable, and monitors the system using data communicated between the safety-extension base and the main base. In a case a fault or defect occurs in the system, a safety-state control is performed by converting the state of the safety-extension base into a safety state. Thus, in a case the fault or defect occurs in the system, the state of the safety-extension base is converted into the safety state so as to perform the safety-state control, thereby stably maintaining and controlling the system. Accordingly, it is possible to prevent, in advance, human and material damage due to the occurrence of a defect of the system.

Generally, automation devices are widely used on industrial spots. Work is efficiently processed through systematical operations between the devices. Recently, various up-to-date devices have been added to existing systems. To this end, extension bases having various purposes are connected to an existing main base so as to achieve high productivity. In addition, interest in safety problems according to the use of complicated devices is gradually increased. Accordingly, various safety measurements are required to reduce human and material damage caused by malfunction of the system.

From such a viewpoint, in a case a fault occurs in the main base of the system, the present invention allows the safety-extension base to independently maintain and control the system in a safety state by converting the state of the safety-extension base into the safety state, so that it is possible to prevent, in advance, human and material damage caused by malfunction of the system. Accordingly, the present invention can be very usefully applied to industrial spots.

Although the present invention has been explained by the embodiments shown in the drawings described above, it should be understood to the ordinary skilled person in the art that the present invention is not limited to the embodiments but rather that various changes or modifications thereof are possible without departing from the spirit of the present invention. Accordingly, the scope of the present invention shall be determined only by the appended claims and their equivalents.

The invention claimed is:

1. A safety-extension base connected to a main base in a PLC (programmable logic controller) system, comprising:
   a communication unit configured to perform data communication with the main base;
   a system state monitoring unit configured to monitor a state of the PLC system using data communicated between the communication unit and the main base;
   a module control unit configured to control a general operation of the safety-extension base and output a different case of control signals according to whether or not the state of the PLC system is a normal state;
   a memory unit configured to store data transmitted from the main base, a program and information, necessary for controlling a safety state of the safety-extension base;
   a state conversion unit configured to convert the state of the safety-extension base into the normal state or safety state according to the control signal output from the module control unit; and
   a safety-processing unit configured to perform a control of the safety-extension base using information transmitted from the main base in a case when the state of the safety-extension base is converted into the normal state by the state conversion unit, and perform a control of the safety-extension base according to a user-defined program previously stored in the memory unit in a case when the state of the safety-extension base is converted into the safety state by the state conversion unit, wherein the communication unit is further configured to receive, from the main base, initial operation information including initial parameters and setup information and operation information including parameters and a program, previously defined by a user wherein a safety-state control is performed by converting the state of the safety-extension base into the safety state in a case when a defect occurs in the PLC system, and wherein the system state monitoring unit is further configured to decide whether the safety-extension base performs a normal-state control by checking whether the initial operation information is normal.

2. The safety-extension base of claim 1, wherein, in a case the state of the safety-extension base is converted into the safety state, the safety-processing unit independently performs the control of the safety-extension base, separately from the data transmitted from the main base.

3. A control method of a safety-extension base connected to a main base in a PLC (programmable logic controller) system, the method comprising:

receiving, from the main base, initial operation information including initial parameters, setup information and operation information including parameters and a program, previously defined by a user wherein a safety-state control is performed by converting a state of the safety-extension base into a safety state in a case when a defect occurs in the PLC system;

monitoring a state of the PLC system by deciding whether the safety-extension base performs a normal-state control by checking whether the initial operation information is normal;

performing a normal-state control of the safety-extension base using information transmitted from the main base in a case when the PLC system is normal as the monitored result, and converting the state of the safe-extension base into a safety state in a case when the PLC system is not normal; and independently performing a safety-state control using a predetermined user-defined program, separately from the main base, in a case when the state of the safety-extension base is converted into the safety state.

* * * * *